United States Patent
Fujikawa

[11] Patent Number: 5,770,246
[45] Date of Patent: Jun. 23, 1998

[54] INJECTION MOLDING MACHINE

[75] Inventor: Misao Fujikawa, Kaga, Japan

[73] Assignee: Sodick Co., Ltd., Japan

[21] Appl. No.: 687,425

[22] PCT Filed: Dec. 8, 1995

[86] PCT No.: PCT/JP95/02521

§ 371 Date: Aug. 8, 1996

§ 102(e) Date: Aug. 8, 1996

[87] PCT Pub. No.: WO96/17717

PCT Pub. Date: Jun. 13, 1996

[30] Foreign Application Priority Data

Aug. 12, 1994 [JP] Japan .................... 6-335204

[51] Int. Cl.$^6$ ..................................... B29C 45/48
[52] U.S. Cl. .............................. 425/557; 425/558
[58] Field of Search ........................ 425/588, 557, 425/558, 577

[56] References Cited

U.S. PATENT DOCUMENTS

| 4,133,855 | 1/1979 | Pahl | 425/588 |
| 4,726,751 | 2/1988 | Shibata et al. | 425/588 |
| 5,499,915 | 3/1996 | Fujita | 425/557 |

FOREIGN PATENT DOCUMENTS

| 59-81144 | 5/1984 | Japan . |
| 63-415 | 1/1988 | Japan . |
| 2-108017 | 8/1990 | Japan . |
| 3-16222 | 2/1991 | Japan . |
| WO 94/11174 | 5/1994 | WIPO . |

OTHER PUBLICATIONS

Webster's Ninth New Collegiate Dictionary, p. 469, 1986.

*Primary Examiner*—Tim Heitbrink

[57] ABSTRACT

An injection molding machine having an injection plunger (21) capable of moving back and forth within an injection chamber (22) includes a scraper ring (23) attached to one end of an injection cylinder (2) having a hole penetrated by the injection plunger. A protuberance (23a), which forms the smallest diameter portion of the hole penetrating the scraper ring and extends to the surface of the injection plunger, is formed on the inside wall of that scraper ring. The perimeters (23e, 23h) of this protuberance scrape off any molding material which adheres to the injection plunger. The scraper ring has windows (23f, 23g) for the purpose of dropping scraped-off material outside thereof. Preferably, the injection plunger has a shank (21b) and a head (21a) which forms the tip of the injection plunger and which has a diameter larger than the shank and slightly smaller than the injection chamber; the protuberance of the scraper ring has a diameter which is slightly larger than the shank and smaller than the head.

10 Claims, 7 Drawing Sheets

INJECTION MOLDING MACHINE

TECHNICAL FIELD

The present invention relates to an injection molding machine. More specifically, the present invention relates to an injection molding machine in which molding material introduced into an injection chamber formed by an injection cylinder is pushed out from the injection chamber into a metal mold by an injection plunger.

BACKGROUND TECHNOLOGY

In order to push out molding material from an injection chamber formed by an injection cylinder into a metal mold, injection molding machines of the type which use injection plungers usually have a heating cylinder which pre-plasticizes the molding material by heating it before the molding material is introduced into the injection chamber. In general, a channel is provided on this type of injection molding machine in order to connect the hole in the heating cylinder with the injection chamber, and a ball-type check valve is provided within that channel in order to prevent the reverse flow of melted molding material in the injection chamber into the heating cylinder hole when the injection plunger advances.

Figure 12:
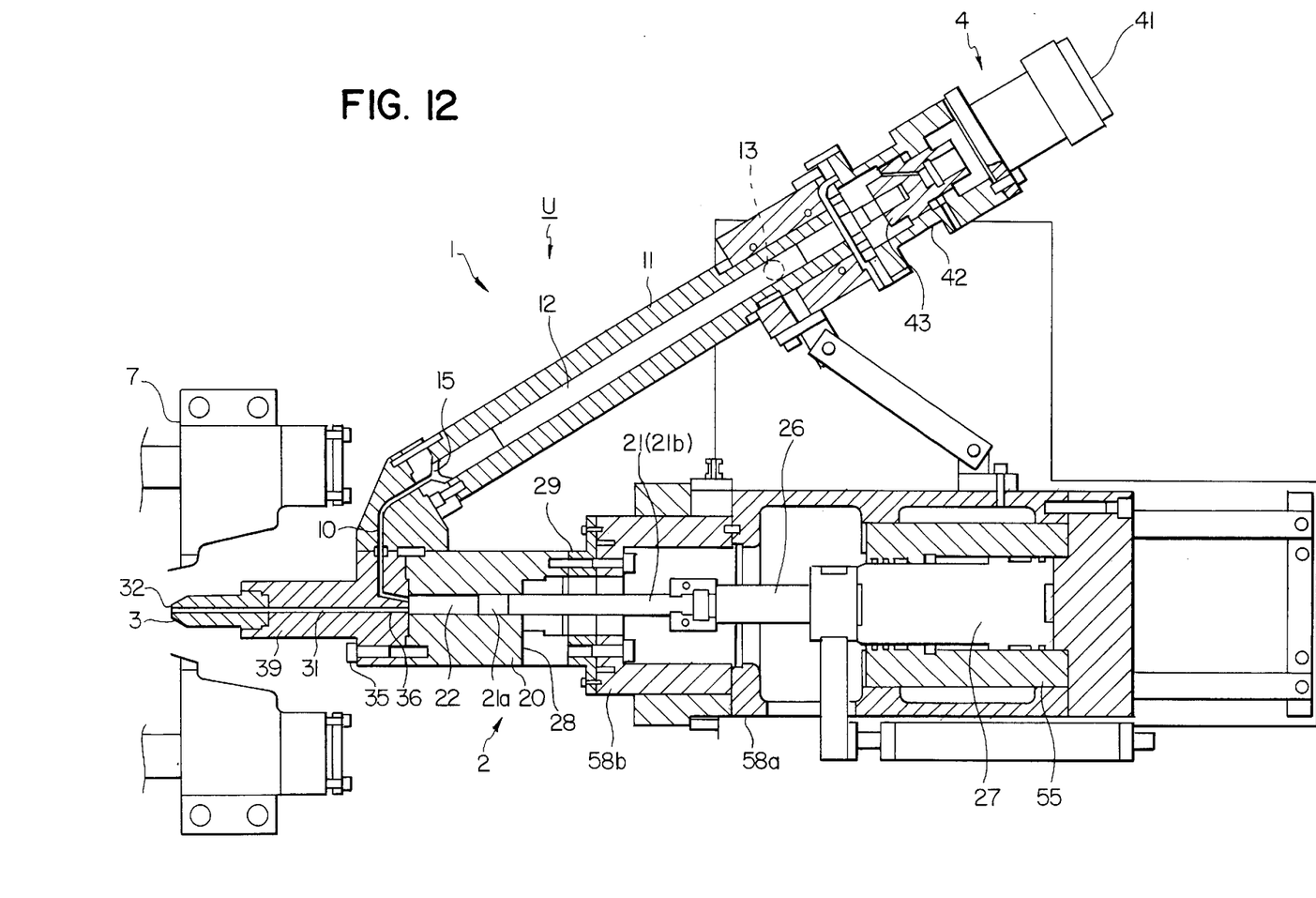
FIG. 12 is a section of conventional injection molding machine.

FIG. 12 is an illustration of a commonly used injection molding machine "U" in which an injection plunger is used to push out pre-plasticized molding material from the injection chamber. This injection molding machine "U" includes a plasticizing unit 1 and an injection unit 2 having an injection cylinder 20, which forms injection chamber 22.

The plasticizing unit 1 includes a heating cylinder 11, which forms a plasticizing chamber 15, and a screw 12, which moves back and forth within the plasticizing chamber 15. A hopper hole 13 is formed in the heating cylinder 11, and resin material is supplied therefrom to a pre-plasticizing chamber The injection molding machine "U" includes a screw drive device 4, which drives the screw 12. The screw drive device 4 includes a motor 41, a cylinder 42, and a piston 43, which moves back and forth within the cylinder 42 by means of hydraulic pressure. The piston 43 is linked to the screw 12 at its front end and to the motor 41 at its back end.

The plasticizing chamber 15 is connected to an injection chamber 22 by means of an appropriate channel 10. The molding material in the plasticizing chamber is plasticized by the rotation of screw 12, and the molding material thus plasticized flows into the injection chamber 22 through a channel 10.

The injection unit 2 includes an injection plunger 21, which moves back and forth within the injection chamber 22, which is a hole in the injection cylinder 20 having a uniform diameter over the entire length thereof. The injection plunger 21 has a shank 21b and a head 21a, the diameter of which is larger than that of shank 21b; it is connected to a ram 27 by rod 26. A window 28 is formed on the back edge of the injection cylinder 20 in order to push the molded material which leaks out of the injection chamber 22 through the gap between the inside wall of the injection cylinder 20 and the injection plunger 21 out of the injection cylinder. The ram 27 moves back and forth by means of hydraulic pressure within the cylinder 55, which is supported within a casing 58a. A casing 58b, which surrounds the connection section between the injection plunger 21 and the rod 26, is linked to the injection cylinder 20 by a flange coupling 29. Case 58a, which supports the cylinder 55, is connected to the casing 58b.

A nozzle adapter 39 is affixed to the front edge of the injection cylinder 20 by means of a bolt 35, and a nozzle 3, which has an opening 32, is attached to the nozzle adapter 39. The nozzle adapter 39 has a channel 31 which penetrates it and which connects the injection chamber 22 to the opening 32, which opens in proximity to the injection chamber 22 in the injection cylinder 20. Melted molding; material pushed out from the injection chamber 22 by the to the opening 32 through the channel 31 and the secondary path 36. From the; opening 32, it is directed to a metal mold affixed to a fixed platen 7.

Figure 9:
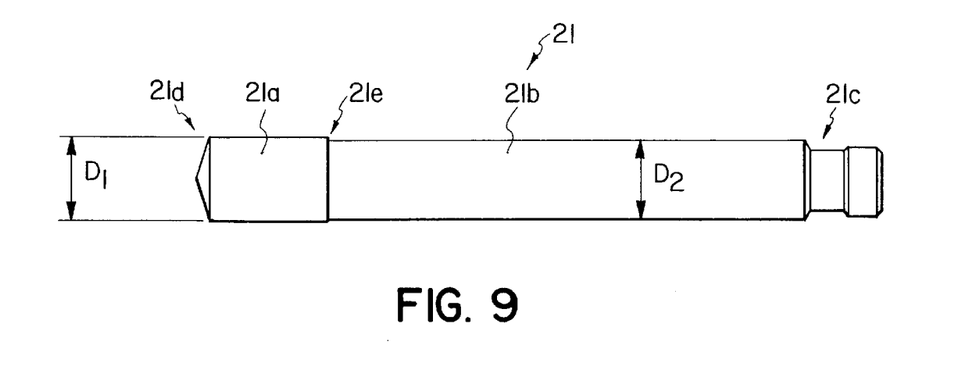
FIG. 9 is a side view of the injection plunger 12 illustrated in FIG.12 and also in FIG. 1.

As is best shown in FIG. 9, the injection plunger 21 includes a head portion 21a and a shank portion 21b which form its tip, and a connecting piece 21c, which forms the base end of plunger 21 and which is linked to the rod 26; these parts of the injection plunger 21 are all formed integrally. The gap between the inside wall of the injection cylinder 20 and the injection plunger 21, which is to say the difference between the diameter $D_1$, of the head 21a and the diameter $D_0$ of the injection cylinder 20 hole 22, is small enough so that molding material does not leak from the gap between them; for example, 0.05 mm. The diameter $D_2$ of the shank 21b which makes up a large portion of the injection plunger 21 is slightly smaller than the diameter $D_1$ of the head 21a, and the difference between diameters $D_1$ and $D_2$ will preferably be larger than 0.05 mm and less than 1.00 mm; for example, it can be approximately 0.1 mm. Therefore the injection cylinder 20 and the injection plunger 21 are fabricated so that the gap between the inside wall of the injection cylinder 20 and shank 21b will be on the order of about 0.075 mm. In general, the length of the head 21a is the same as or longer than its diameter $D_1$, and sufficient contact surface area is assured with the inside wall of the injection cylinder 20 in order to prevent twisting of the head 21a.

When the injection plunger 21 advances, the front scraper 21d acts as a scraper to scrape off any resin adhering to the inside wall of the injection cylinder 20. Furthermore, the scraper 21e formed on the head 21a by the difference in diameters between the head 21a and shank 21b acts as a scraper to scrape off any resin remaining on the inside wall of the injection cylinder 20 when the injection plunger 21 draws back, pulling it out of injection chamber 22. Any resin pushed out of the injection chamber drops out of the injection cylinder 20 through the window 28.

Adhering of resin to the inside wall of the injection cylinder 20 is thus prevented by scrapers 21d and 21e, but resin can adhere to the injection plunger 21, and in particular to the surface of the shank 21b. Since the injection cylinder 20 is maintained at a high temperature, resin adhering to the surface of the shank 21b is thermally displaced and carbonized. A portion of this carbonized material may break up and pass through the gap between the inside wall of the injection cylinder 20 and the head 21a, mixing into the molten molding material in the injection chamber 22 and degrading the quality of the molded parts. In addition, particles of carbonized material existing in the gap between the inside wall of the injection cylinder 20 and the head 21a may impart an undesirable effect on the axial concentricity of the injection cylinder 20 and the injection plunger 21.

Because the window 28 is formed on the injection cylinder 20, when the injection cylinder 20 is exposed to high temperatures, expansion and contraction can be non-uniform, causing a slight distortion. This distortion can also impart an undesirable effect on the axial concentricity of the injection cylinder 20 and the injection plunger 21.

The object of the present invention is to provide an injection molding machine in which adhesion of resin to the injection plunger surface is prevented.

Another object of the present invention is to provide an injection molding machine in which the injection plunger moves back and forth in the injection cylinder hole, maintaining axial concentricity between the injection cylinder and the injection plunger.

Still other objects of the present invention, as will be partially discussed in the explanation below, will be clear to practitioners of the art through implementation of the invention.

DISCLOSURE OF THE INVENTION

In order to achieve the above objectives, an injection molding machine having an the injection cylinder (20) which forms the injection chamber (22) into which the molding resin is introduced and an the injection plunger (21) capable of moving back and forth in the injection chamber to push the molding resin out of the injection chamber, includes a scraper ring (23) which has a hole through which the injection plunger passes and is attached to one end of the injection plunger; a protuberance (23a) extending to the surface of the injection plunger is formed on the inside wall of the scraper ring so as to scrape off molding material from th e surface of the injection plunger.

Preferably, the scraper ring has windows (23f, 23g) through which scraped-off material may drop out of the injection chamber.

Furthermore, the injection plunger preferably has a shank (21b) and a head (21a) which forms the tip of the injection plunger and has a diameter larger than the shank and slightly smaller than the injection chamber; the protuberance on the scraper ring having a diameter slightly larger than the shank and smaller than the head.

Also, a flange coupling (29) is preferably provided which connects to the injection cylinder and into which the scraper ring fits. That flange coupling may also include at least one flange (29b) around the outer perimeter of which a pipe (P) carrying cooling water is wrapped.

Also, a guide ring (24) having a hole (24a) of essentially the same diameter as the protuberance and penetrated by the injection plunger may also be connected to the flange coupling.

PREFERRED FORM FOR IMPLEMENTATION OF THE INVENTION

Figure 1:
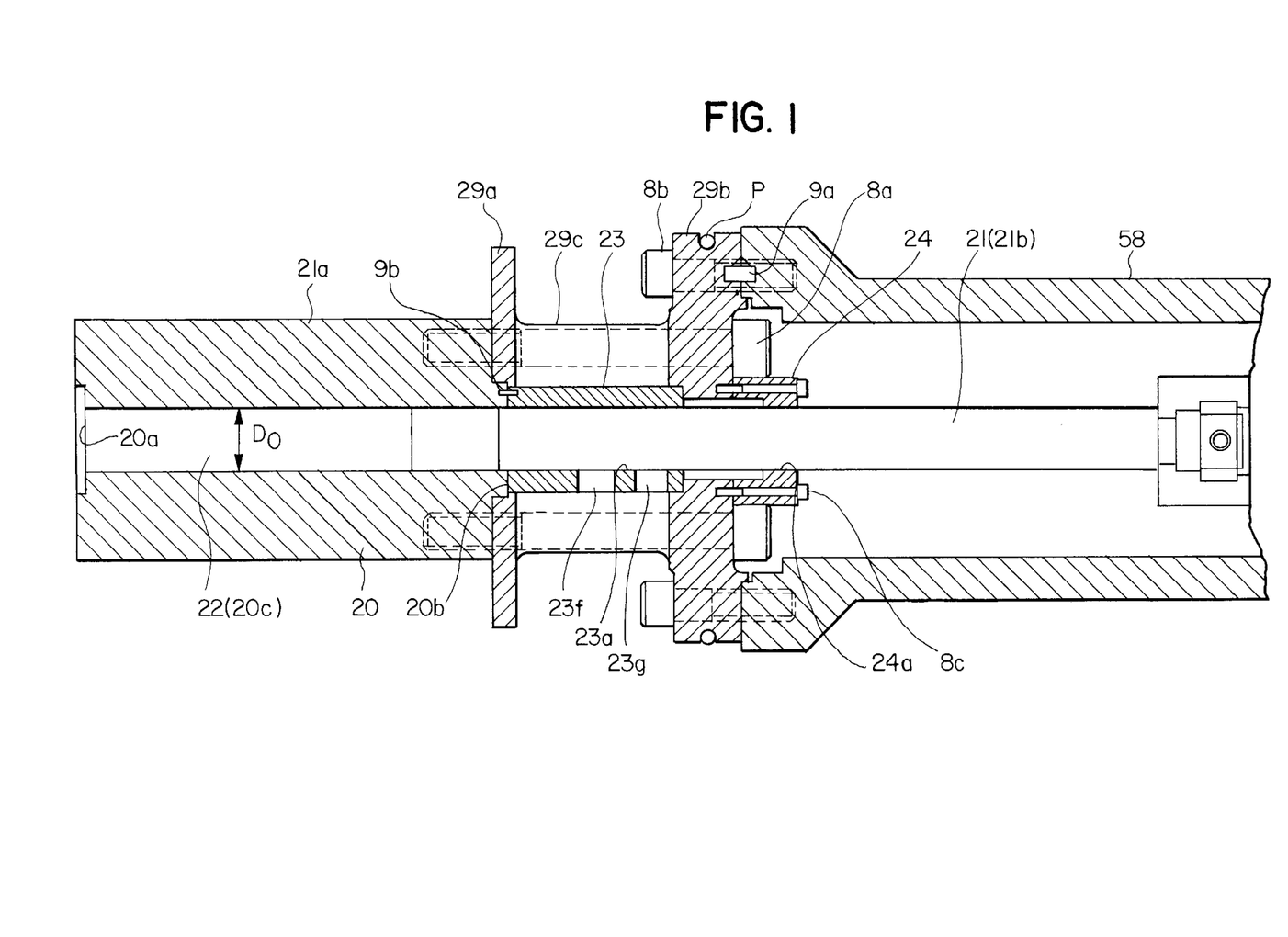
FIG. 1 is an overview block diagram illustrating the injection portion of an injection molding machine according to an embodiment of the present invention.
Figure 2:
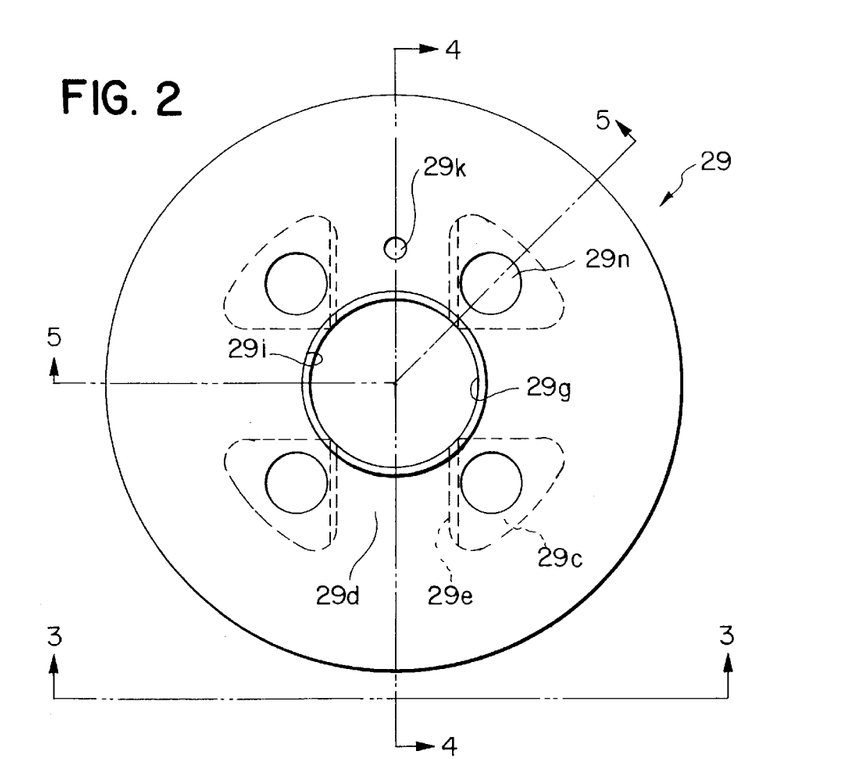
FIG. 2 is a plan view diagram of the flange coupling shown in FIG. 1 as seen from the front side.
Figure 3:
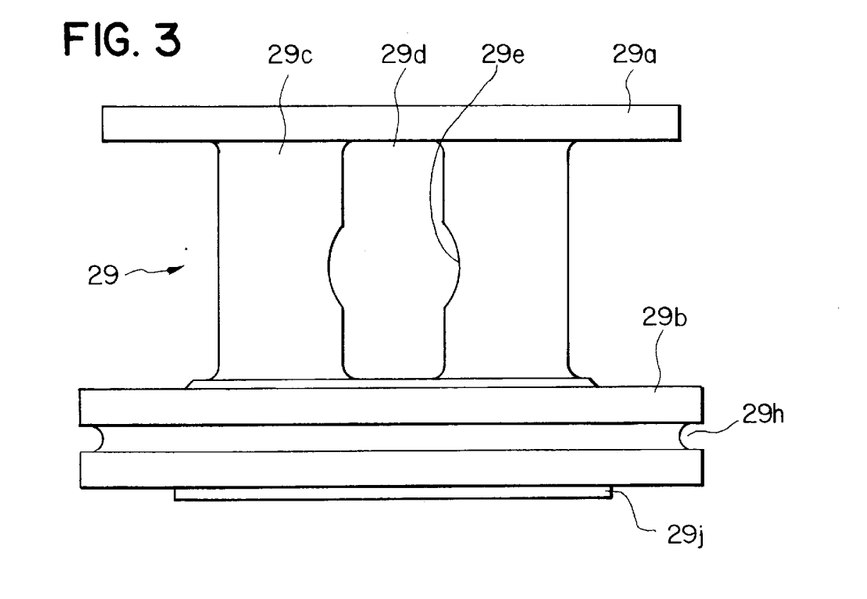
FIG. 3 is a side view of the flange coupling viewed along line A—A in FIG. 2.

The present invention will now be explained with reference to the various figures. FIG. 1 illustrates the injection portion of the injection molding machine in accordance with an embodiment of the present invention.

The same reference numerals are assigned to those elements previously described in connection with FIG. 12; explanation of these elements will be omitted from the discussion of FIG. 1. Facing FIG. 1, the left side corresponds to the front of the injection portion of the machine, and the right side corresponds to the back.

The injection cylinder 20 of the present invention has at its center a passageway 20c of diameter $D_0$ which penetrate through its interior; no structure such as the window 28 in FIG. 12 is formed on the interior wall thereof. In general, the injection cylinder 20 is fabricated of a material such as structural alloy steel or alloy machine steel, and is surface-treated by sintering or nitrification. An indentation 20a is formed on the front end of the injection cylinder 20 in order to attach nozzle adapter 39 to the injection cylinder 20. A rearwardly extending protuberance 20b is formed on the back end of the injection cylinder 20 along the perimeter of passageway 20c. A scraper ring 23 is connected to the injection cylinder 20 by means of a pin 9b, which is planted in the protuberance 20b. The flange coupling 29 is affixed to the back end of the injection cylinder 20 by means of a bolt 8a. The casing 58, covers the drive section which hydraulically drives the injection plunger 21, and is aligned with respect to the flange coupling 29 by means of a pin 9a, and is affixed by means of a bolt 8b. Furthermore, a guide ring 24, which has a hole 24a penetrated by the injection plunger 21, is affixed to the flange coupling 29 by means of a bolt 8c.

As illustrated in FIGS. 2, 3, 4, and 5, the flange coupling 29 is made up of a disc-shaped front flange 29a, a disc-shaped rear flange 29b which is preferably thicker than front flange 29a, and embodiment 4 columnar units each having ¼ disc sections, which collectively comprise a connecting part 29c, which connects the flanges 29a and 29b. The front flange 29a and the rear flange 29b respectively have holes 29g and 29m, which in use are penetrated by the injection plunger 21. The connecting part 29c may be considered as being formed of a horizontal pair of upper columnar units and a horizontal pair of lower columnar units; each of these columnar units being positioned at equal spacing 29d with respect to the axis of the flange 29, and connecting the hubs of the flanges 29a and 29b. The four holes 29n for the bolts 8a respectively penetrate the four columnar units in the connecting part 29c. The flange coupling 29 is preferably fabricated by casting.

An indentation 29i, which compliments the protuberance 20b on the injection cylinder 20, is formed on the front flange 29a. Furthermore, a pin hole 29k, for the purpose of registering the flange coupling 29 with respect to the injection cylinder 20, is formed on the front flange 29a.

Figure 4:
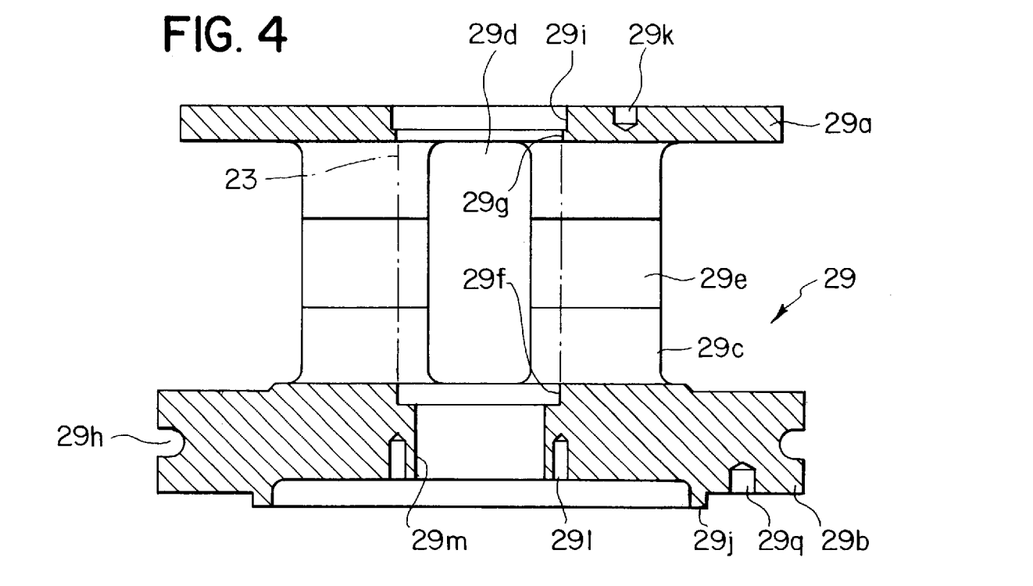
FIG. 4 is a side view of the flange coupling viewed along line B—B in FIG. 2.
Figure 5:
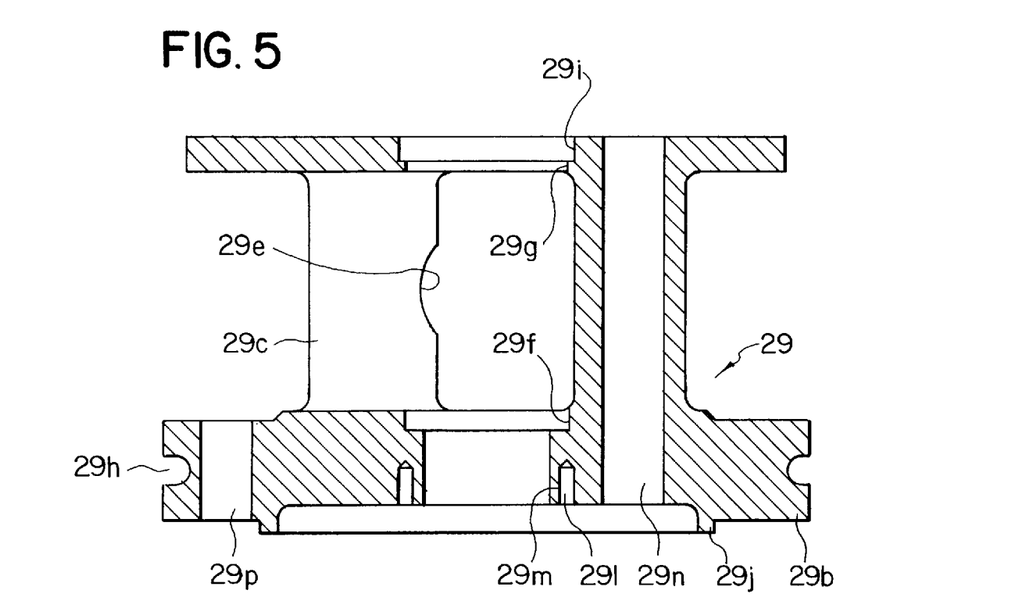
FIG. 5 is a cross-sectional view of the flange coupling viewed along line C-0-C in FIG. 2.

As is best depicted in FIGS. 4 and 5, hole 29q for registering with the pin 9a is positioned in the vicinity of the outer periphery of the rear flange 29b, as are the ten holes 29p for the bolts 8b. The protrusion 29j, which fits onto the casing 58, is provided on the rear flange 29b. A channel 29h is provided along the perimeter surface of flange 29b. A pipe P, capable of being easily bent to conform to a curve, such as steel pipe, is preferably wrapped along the channel 29h for the purpose of conveying cooling water; the pipe P may also be used to block the transfer of heat to the drive portion of the injection plunger 21. A plurality, e.g. eight tap holes 291*l*, for the bolts 8*c* are provided in the vicinity of the hole 29*m*, and centered about the hole 29*m*.

As is best shown in FIG. 4, the scraper ring 23 has an outside diameter such that it will fit into the indentation 29*f* of the rear flange 29*b*, and will also fit into the hole 29*g* on the front flange 29*a*.

Figure 6:
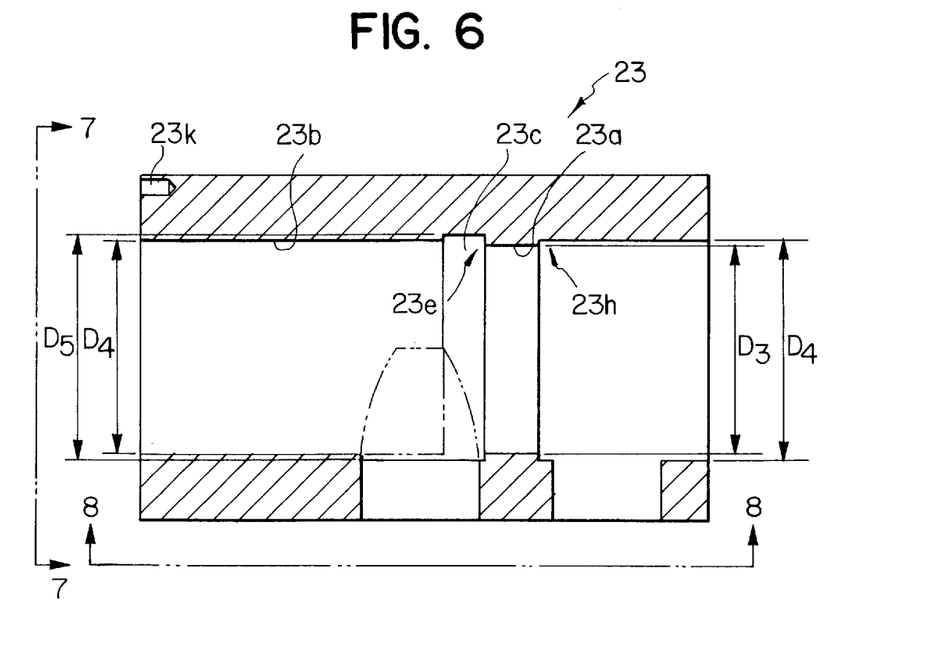
FIG. 6 is a vertical cross-section of the scraper ring in FIG. 1 viewed along line G-G in FIG. 7.
Figure 7:
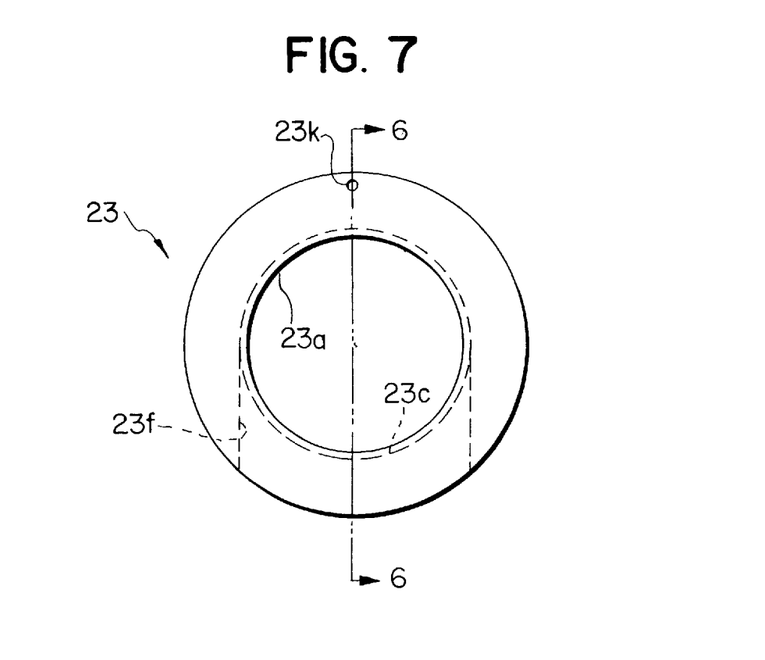
FIG. 7 is a side view of the FIG. 1 scraper ring viewed along line E—E in FIG. 6.
Figure 8:
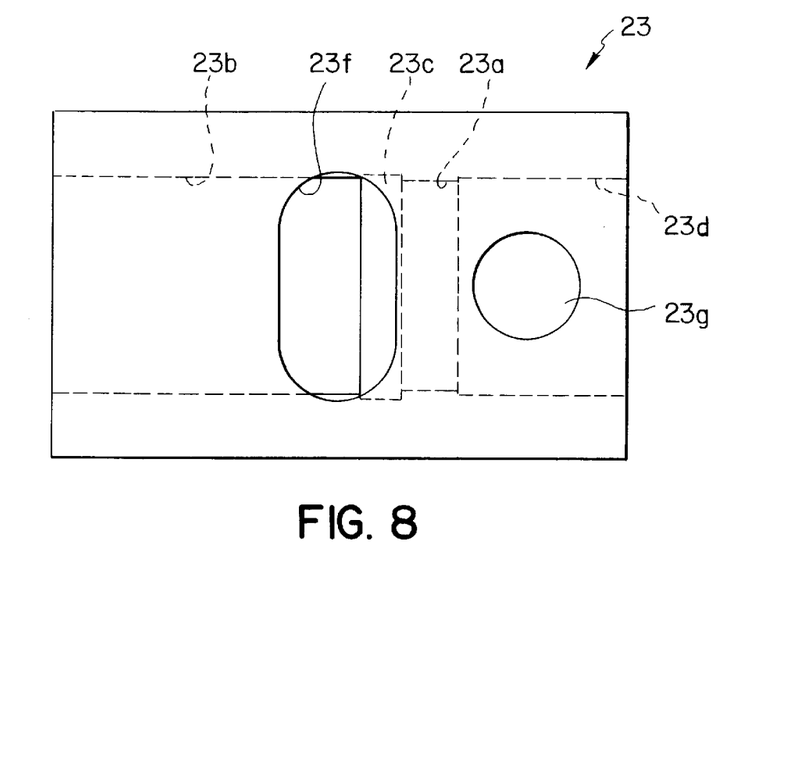
FIG. 8 is a side view of the FIG. 1 scraper ring viewed along line F—F in FIG. 6.

As is illustrated in FIGS. 6, 7, and 8, a pin hole 23*k* for the pin 9*b* is formed on the upper front edge of the scraper ring 23. A protuberance 23*a*, which extends to the surface of the injection plunger 21, is formed on the inside wall of the scraper ring 23. The protuberance 23*a* is the smallest inner-diameter part of the hole in the scraper ring 23 penetrated by the injection plunger 21. Preferably, the position of protuberance 23*a* is determined so that the perimeter 21*e* of the head 21*a* of the injection plunger 21 will come very close to the front perimeter 23*e* of protuberance 23*a* when the injection plunger 21 is maximally withdrawn. A channel 23*c* is formed alongside and adjacent to the protuberance 23*a*. The channel 23*c* is the largest inner-diameter part of the hole in the scraper ring 23. An a passageway 23*b*, extends from the channel 23*c*, to the front edge of the scraper ring 23; another passageway 23*d*, extends rearwardly from the back of the protuberance 23*a*, to the rear edge of the scraper ring 23.

The protuberance 23*a* has an inner diameter $D_3$ which is slightly larger — for example between about 0.02 and 0.08 mm, larger — than diameter $D_2$ of the shank 21*b*, and is smaller than the head 21*a*. The passageway 23*b* and 23*d* have an inner diameter $D_4$ which is approximately 1.0 mm larger than the inner diameter of protuberance 23*a* and between approximately 0.5 and 1.0 mm larger than the passageway 20*c* in the injection cylinder 20. The channel 23*c* has an inner diameter approximately 1.0 mm larger than inner diameter $D_4$.

When the injection plunger 21 is withdrawn — in other words, at the time when the molding material is weighed — any molding material adhering to the surface of the shank 21*b* is scraped off by the front perimeter 23*e* of the protuberance 23*a*. In order to push the scraped-off material outside of the scraper ring 23, a long window 23*f*, which is wider than the channel 23*c*, opens on the bottom of the inside wall of the scraper ring 23. Scraped-off material is pushed from the long window 23*f* to a location outside of the scraper ring 23, passing through the interval between the two horizontally arrayed bottom columnar units 29*c* and dropping down to where it may be recovered by an appropriate receiving dish placed under the scraper ring 23. When the injection plunger 21 is withdrawn, material scraped off the inside wall of the injection cylinder 20 by the perimeter 21*e* is guided to the long window 23*f* by the steep side wall (flank) of protuberance 23*a*.

When the injection plunger 21 advances and pushes the molding material out of the injection chamber 22, material adhering to the surface of the shank 21*b* is scraped off by the rear perimeter 23*h* of protuberance 23*a*. A circular window 23*g* opens on the bottom of the inside wall of the scraper ring 23 in order to permit the scraped-off material to drop out of the scraper ring 23. In order to cause the material pushed out of windows 23*f* and 23*g* to 23, an indentation 29*e* may be formed on the columnar units 29*c*, as shown in FIGS. 2, 3, 4, and 5.

In this way, the protuberance 23*a* contributes to causing material scraped from the inside wall of the injection cylinder 20 and from the surface of the injection plunger 21 to fall in a fixed position. Dropped off molding material may then be recovered in an appropriate receiving dish.

Figure 10:
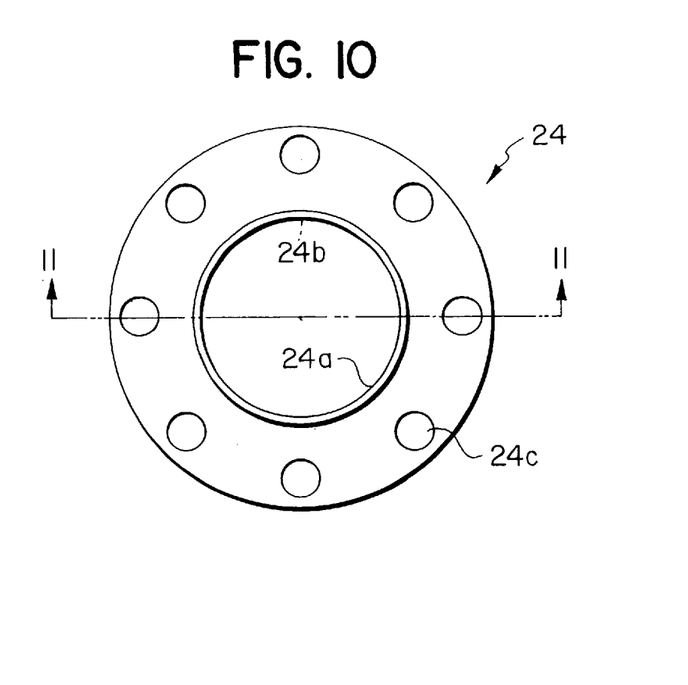
FIG. 10 is a plan view of the FIG. 1 guide ring.
Figure 11:
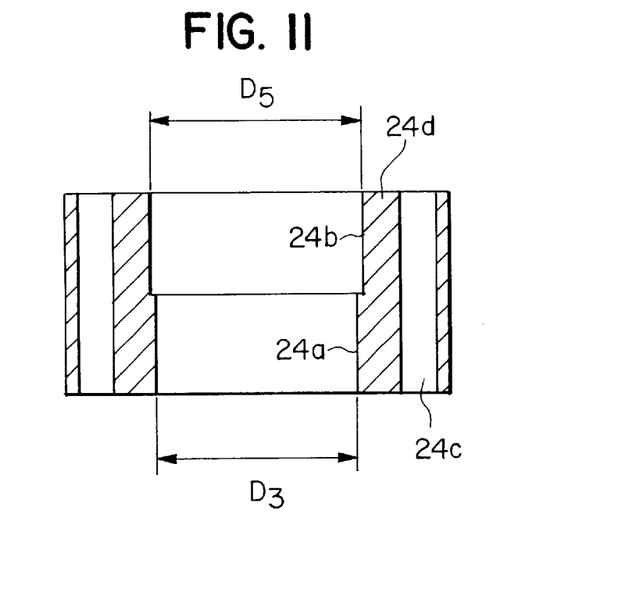
FIG. 11 is a section of the FIG. 1 guide ring viewed along line H—H in FIG. 10.

As illustrated in FIGS. 10 and 11, a guide ring 24 having a hole 24*a* with the same diameter $D_3$ as the protuberance 23*a* on the scraper ring 23, and a passageway 24*b* having the same diameter D, as the channel 23*c* on the scraper ring 23 may be provided. A plurality of holes 24*c* for the bolts 8*c* are provided in the vicinity of the outer perimeter of guide ring 24.

Referring to FIG. 1, the procedure for assembling the main elements shown in FIG. 1 will now be explained.

First, the scraper ring 23 is fit into the flange coupling 29. Next, the connecting part 21*c* and shank 21*b* on the injection plunger 21 are inserted into the hole on the scraper ring 23. The guide ring 24 is then attached to the rear flange 29*b* on the side of edge surface 24*d*. The flange coupling 29 is connected to the injection cylinder 20.

When the main elements are thus assembled, the hole 24*a* on guide ring 24, the protuberance 23*a* on the scraper ring 23, and the passageway 20*c* in the injection cylinder 20 will maintain concentricity. The hole 24*a* and the protuberance 23*a* form an axle bearing for the injection plunger 21, and the injection plunger 21 can move back and forth stably.

The objects of the present invention are not limited to the precise forms disclosed; it is clear that many improvements and variations are possible with reference to the above explanation. The above embodiments were selected for the purpose of explaining the essence of the invention and the practical application thereof. The scope of the invention is defined by the attached Claims.

We claim:

1. An injection molding machine having an injection chamber into which a molding resin may be introduced, said injection chamber having an inside wall, an injection plunger capable of reciprocal movement within said injection chamber whereby molding resin is ejected from said injection chamber; said injection plunger including a shank portion and a head portion having an edge, said head portion having a diameter larger than that of the shank portion wherein said edge is operable to scrape any molding resin adhering to the inside wall of said injection chamber, and a scraper ring having a passageway aligned with the injection chamber and adapted to be penetrated by said injection plunger;

said scraper ring having a protuberance formed on an inside wall thereof, said protuberance extending substantially to a surface of said injection plunger and having a diameter which is smaller than the head portion of said injection plunger but slightly larger than the shank portion thereof; and a window located in said scraper ring through which molding material may pass.

2. The injection molding machine of claim 1, wherein said protuberance defines the smallest diameter portion of the passageway in the said scraper ring.

3. The injection molding machine of claim 2, wherein said injection chamber is formed within an injection cylinder and further comprising a flange coupling, connected to said injection cylinder, into which said scraper ring fits.

4. The injection molding machine of claim 3, further comprising a pipe for carrying coolant wherein said flange coupling further comprises at least one flange around which said pipe is disposed.

5. The injection molding machine of claim 3, further comprising a guide ring connected to said flange coupling and axially aligned with said scraper ring and having a passageway of essentially the same diameter as said protuberance and adapted to be penetrated by the injection plunger.

6. The injection molding machine according to claim 2, wherein said protuberance comprises an annular ring having a leading edge and a trailing edge.

7. The injection molding machine according to claim 3, wherein said flange coupling comprises first and second disc shaped flanges axially spaced by a plurality of connecting members, at least one of said connecting members includes an indentation formed to direct the scraped off molding material out of said scraper ring.

8. The injection molding according to claim 7, wherein said injection chamber is formed within an injection cylinder and further comprises means for positioning and registering said flange coupling with respect to said injection cylinder.

9. The injection molding machine according to claim 7, further comprising indentation means formed in said first and second disc shaped flanges for holding said scraper ring in said flange coupling.

10. The injection molding machine according to claim 1, wherein said protuberance comprises an annular ring having a leading edge and a trailing edge and said scraper ring further comprises a second window positioned adjacent to and rearwardly of said trailing edge.

* * * * *